US012589667B1

(12) United States Patent
Pan et al.

(10) Patent No.: US 12,589,667 B1
(45) Date of Patent: Mar. 31, 2026

(54) HEAT DISSIPATION DEVICE FOR CABLE GUN HEAD THROUGH LIQUID METAL ISOTHERMAL EXTENSION COUPLED WITH LIQUID COOLING LOOP

(71) Applicant: Shanghai Funing GalliumCool Technologies Inc., Shanghai (CN)

(72) Inventors: Jinyi Pan, Shanghai (CN); Richard Pan, Shanghai (CN); Jianwu Pan, Shanghai (CN)

(73) Assignee: Shanghai Funing GalliumCool Technologies Inc., Shanghai (CN)

( * ) Notice: Subject to any disclaimer, the term of this patent is extended or adjusted under 35 U.S.C. 154(b) by 0 days.

(21) Appl. No.: 19/375,305

(22) Filed: Oct. 31, 2025

(30) Foreign Application Priority Data

Sep. 25, 2025 (CN) .......................... 202511383949.9

(51) Int. Cl.
B60L 53/302 (2019.01)
B60L 53/62 (2019.01)

(52) U.S. Cl.
CPC ............. B60L 53/302 (2019.02); B60L 53/62 (2019.02)

(58) Field of Classification Search
CPC ............................... B60L 53/302; B60L 53/62
See application file for complete search history.

(56) References Cited

U.S. PATENT DOCUMENTS 11,476,015 B2 10/2022 Cantz
11,718,192 B2 8/2023 Führer 12,046,844 B2 7/2024 Cole
2015/0217654 A1 8/2015 Woo et al.
2019/0291588 A1 9/2019 Chou et al.

FOREIGN PATENT DOCUMENTS

| CN | 108199162 A | 6/2018 | |
| CN | 213340790 U | 6/2021 | |
| CN | 114103688 A | 3/2022 | |
| CN | 114899639 A | 8/2022 | |
| CN | 115352295 A | * 11/2022 | .............. B60L 53/11 |
| CN | 115911929 A | 4/2023 | |
| CN | 220785477 U | 4/2024 | |
| EP | 3766726 A1 | 1/2021 | |
| EP | 3929945 A1 | 12/2021 | |
| WO | 2017133893 A1 | 8/2017 | |
| WO | 2019180622 A1 | 9/2019 | |

* cited by examiner

*Primary Examiner* — Travis S Chambers
(74) *Attorney, Agent, or Firm* — Bayramoglu Law Offices LLC

(57) ABSTRACT

A heat dissipation device for a cable gun head through liquid metal (LM) isothermal extension coupled with liquid cooling loop is provided. The device includes a liquid metal heat collection chamber, the liquid metal inlet and outlet tube, a heat dissipation coupling chamber, the magnetic pump, liquid cooling inlet and outlet tube. The liquid metal heat collection chamber is filled internally with gallium-based liquid metal alloy. The LM circulates through inlet and outlet tubes that extend into heat-exchange coupling chamber, where the LM, confined within the tubes, transfers heat across tube walls to a separate coolant without mixing. Circulation is produced by a passive magnetic-coupling pump driven by returning coolant. The device expands the effective heat dissipation area of high heat flux density regions in the charging gun by more than a thirtyfold using LM isothermal extension, and enhances the ability to cope with extreme heat loads.

11 Claims, 4 Drawing Sheets

HEAT DISSIPATION DEVICE FOR CABLE GUN HEAD THROUGH LIQUID METAL ISOTHERMAL EXTENSION COUPLED WITH LIQUID COOLING LOOP

CROSS REFERENCE TO THE RELATED APPLICATIONS

This application is based upon and claims priority to Chinese Patent Application No. 202511383949.9, filed on Sep. 25, 2025, the entire contents of which are incorporated herein by reference.

TECHNICAL FIELD

The present disclosure relates to heat dissipation technologies for high-power electric-vehicle (EV) charging systems. More particularly, it pertains to a charging cable gun (also called a charging gun head) that couples a high-conductivity liquid-metal isothermal spreader with a liquid-cooling loop to mitigate localized, transient hot spots.

BACKGROUND

With the charging power of electric vehicles entering the megawatt level (e.g., 1.5 MW and above), the heat dissipation problem at the cable gun head has become a key factor limiting the improvement of charging power. In megawatt-level liquid-cooled charging systems, the connector terminals, a charging plug head, sleeve contact areas, and a root portion of the cable form millimeter-level "point heat sources" due to contact resistance and geometric constraints, resulting in extremely high transient heat density, which is the main cause of thermal failure. The heat generation in these areas can account for about 40% of the total heat generation of the entire cable.

Existing liquid-cooled cables dissipate heat by flowing cooling liquid, with the main effect being average temperature reduction along the entire cable. Whether the liquid cooling medium passes through or wraps (immerses) the gun head connection terminals, it cannot solve the problem of severe local heating in the connection area. Simply increasing the flow rate of the liquid cooling medium (such as silicone oil, water-ethylene glycol, fluorinated liquid, etc.) in gun head narrow space makes it difficult to quickly shave peaks, and significantly increases pump power and pressure loss, leading to excessive flow and energy consumption in the entire system, increased system complexity, and cost.

Existing technologies mostly rely on traditional liquid cooling media to directly remove heat through intermediate flow channels or immerse the entire gun head root and connection terminals in non-conductive flowing cooling liquid, such as:

U.S. Patent Publication No. US20150217654 A1, titled "Charging Cable Cooling," which describes introducing cooling liquid into the cable and charging gun handle interior, with flow channels surrounding the contacts and handle for removing heat from the connection area.

U.S. Patent Publication No. US20190291588 A1/WO 2019180622, titled "Liquid-Cooled Charging Connector," which designs a cooling liquid distribution manifold in the plug handle, with cooling liquid circulating through sleeves around DC receptacles to achieve direct heat dissipation from the plug port.

European Patent Publication No. EP 3929945 A1/U.S. Pat. No. 11,476,015 B2, titled "Liquid-Cooled Cable and Charging Cable Assembly," which describes arranging cooling channels between conductors and extending the cooling liquid into the plug housing to effectively reduce contact temperature rise.

International Patent Publication No. WO 2017133893 A1, titled "Cable Assembly," which proposes an early liquid-cooled cable solution with cooling channels formed inside the cable and extending to the connector cavity.

U.S. Patent No. U.S. Pat. No. 11,718,192 B2, titled "Grounding and Cooling System for Charging Plug," which combines cooling liquid flow channels with grounding/PE structures within the plug body, enhancing both heat dissipation and safety performance.

European Patent Publication No. EP 3766726 A1/U.S. Patent Publication No. U.S. Pat. No. 12,046,844, titled "Liquid-Cooled Charging System for Vehicles," which defines a vehicle charging system where cooling liquid flows through the charging gun-vehicle socket interface to directly cool contacts and connector housings.

Chinese Patent Publication No. CN 114899639 A, titled "Liquid-Cooled Cable Connector and Charging Gun," which forms cooling liquid channels around the charging gun plug and pins, equipped with detachable cooling adapters.

Chinese Patent Publication No. CN 114103688 A, titled "Charging Gun Liquid Cooling System and Charging Gun," which provides inlet/outlet liquid flow channels inside the gun head with multi-layer sealing structures for direct cooling of contact terminals.

Chinese Utility Model Patent No. CN 220785477 U, titled "A Liquid-Cooled Charging Gun Head," which proposes a dual-cavity liquid-cooled gun head with a cooling interface at the rear.

Chinese Patent Publication No. CN 115911929 A, titled "A Liquid-Cooled Charging Gun Quick-Change Structure," which proposes a modular design for quick replacement of gun heads and terminals with cooling structures for easy maintenance.

Chinese Utility Model Patent No. CN 213340790 U, titled "A Liquid-Cooled DC Charging Gun," which provides independent cooling channels for positive and negative terminals in a DC charging gun.

Chinese Patent No. CN 108199162 B, titled "Liquid-Cooled Charging Socket," which integrates cooling liquid channels around contacts in the vehicle-side charging socket to reduce temperature rise.

From various liquid cooling patents and industry developments, existing liquid cooling systems are relatively mature with a complete and mature supply chain. However, existing patents all use an average heat dissipation method with one liquid cooling medium for the entire cable. The thermal conductivity of the liquid cooling medium is typically between 0.6-1.0 W/m·K, which is extremely low. For transient high-density "point heat sources," traditional solutions must increase the liquid cooling medium flow rate and system pressure for the overall cable, or enhance heat dissipation capability through complex structural designs. This not only increases system complexity and cost but also brings challenges in reliability.

SUMMARY

The purpose of the present invention is to provide a heat dissipation device for a cable gun head through liquid metal isothermal extension coupled with liquid cooling loop. Through the coupling of high-conductivity liquid metal and liquid cooling loop, it significantly improves the heat dissipation efficiency for transient high-density point heat sources.

The present invention provides a technical solution:

A heat dissipation device for a cable gun head through liquid metal isothermal extension coupled with liquid cooling loop, the device being disposed inside a charging gun head (18) of a liquid-cooled ultra-fast charging system, comprising a liquid metal heat collection chamber (1), a liquid metal heat conduction tube (2), a liquid metal heat conduction return tube (3), a heat dissipation coupling chamber (4), the magnetic pump (5), a liquid cooling return tube (6), and a liquid cooling inlet tube (7);

The liquid metal heat collection chamber (1) is disposed inside the connection conductor of the charging gun head (18), filled internally with gallium-based liquid metal alloy. The inlet end of the liquid metal heat conduction tube (2) communicates with the liquid metal heat collection chamber (1), and the outlet end extends outward to the heat dissipation coupling chamber (4) and connects to the inlet end of the liquid metal heat conduction tube (2). The outlet end of the liquid metal heat conduction return tube (3) communicates with the liquid metal heat collection chamber (1). The magnetic pump (5) is used to drive the gallium-based liquid metal alloy to circulate in the liquid metal heat collection chamber (1), the liquid metal heat conduction tube (2), and the liquid metal heat conduction return tube (3), achieving real-time isotherm of the liquid metal;

The inlet end of the liquid cooling inlet tube (7) communicates with a water tank (22) in the liquid-cooled ultra-fast charging system, and the outlet end communicates with the heat dissipation coupling chamber (4). The inlet end of the liquid cooling return tube (6) communicates with the heat dissipation coupling chamber (4), and the outlet end communicates with a radiator (21) in the liquid-cooled ultra-fast charging system. The heat dissipation coupling chamber (4) is disposed inside the charging gun handle for heat exchange between the gallium-based liquid metal alloy and the liquid cooling medium.

Furthermore, the liquid-cooled ultra-fast charging system comprises a charging gun head (18), liquid-cooled cable (19), liquid-cooled charging module (20), radiator (21), water tank (22), and a water pump (23). The water pump (23) is used to drive the liquid cooling medium to circulate in the liquid-cooled cable (19), the liquid cooling inlet tube (7), the liquid cooling return tube (6), the radiator (21), and the water tank (22). The magnetic pump (5) is driven by the return flow of the liquid cooling medium.

Furthermore, the inner wall of the liquid metal heat collection chamber (1) is treated with nickel plating or ceramic coating. The liquid metal heat conduction tube (2) and the liquid metal heat conduction return tube (3) are made of copper, aluminum, or stainless steel and undergo nickel plating or ceramic coating protection. The connection between the two and the liquid metal heat collection chamber (1) is first mechanically or weld-sealed with a sealing ring, and then vacuum-sealed with polytetrafluoroethylene (PTFE) wrap at the joint position.

Furthermore, the length of the liquid metal heat conduction tube (2) and the liquid metal heat conduction return tube (3) inside the heat dissipation coupling chamber (4) is 80-200 mm, and both have an inner diameter of 4-10 mm. The outer surfaces of the liquid metal heat conduction tube (2) and the liquid metal heat conduction return tube (3) are configured as smooth structures, corrugated structures, or heat dissipation fin structures.

Furthermore, the outlet end of the liquid metal heat conduction tube (2) connects to the inlet end of the liquid metal heat conduction return tube (3) to form a U-shaped structure. The gallium-based liquid metal alloy returns to the liquid metal heat collection chamber (1) through the U-shaped loop, forming a complete closed liquid metal isothermal loop.

Furthermore, the liquid cooling medium is either deionized water plus ethylene glycol, thermal oil, or fluorinated liquid, with a thermal conductivity of 0.1-0.4 W/m·K. The flow rate of the liquid cooling medium is 6-32 L/min, adapting to ambient temperatures from −50° C. to +45° C., used for average heat dissipation of the liquid-cooled cable (19) and heat exchange with the gallium-based liquid metal alloy. The liquid cooling medium drives the magnetic pump (5) to operate, and the magnetic pump (5) drives the gallium-based liquid metal alloy to circulate. The single loop time of the gallium-based liquid metal alloy in the closed isothermal loop is 20-100 ms.

Furthermore, the magnetic pump (5) comprises a magnetic coupling outer gear (10), a liquid metal closed drive chamber (11), an outer magnetic disk (24), an outer magnet (12), an outer bearing (13), a magnetic pump closed chamber (14), an inner bearing (15), an inner magnet (16), a magnetic coupling inner gear (17), liquid cooling medium inlet and outlet flow channels, and liquid metal inlet and outlet tubes;

The inner and outer chambers of the magnetic pump (5) are two separate closed systems. The outer chamber connects to the liquid cooling return tube (6), and the liquid cooling medium passes through the magnetic coupling outer gear (10) to the heat dissipation coupling chamber (4). The inner chamber inlet and outlet connect to the liquid metal heat conduction tube (2), and the liquid metal is pushed by rotation of the magnetic coupling inner gear (17) in the inner chamber;

The magnetic coupling outer gear (10) and the magnetic coupling inner gear (17) are each embedded with 4-8 permanent magnets having a surface magnetic induction strength of 3500G-5000G. The inner and outer permanent magnets are isolated by a 1-2 mm closed chamber. The magnetic coupling outer gear (10) and the magnetic coupling inner gear (17) are magnetically coupled. The liquid cooling medium enters the outer chamber of the magnetic pump (5), pushing the magnetic coupling outer gear (10) to rotate. Through magnetic coupling, it drives the magnetic coupling inner gear (17) to rotate, and the rotation of the magnetic coupling inner gear (17) drives the liquid metal to flow, thereby achieving liquid metal circulation without an external motor.

Furthermore, the number of magnetic pumps (5) is two, respectively a first passive magnetic pump disposed at the inlet of the heat dissipation coupling chamber (4) and a second passive magnetic pump disposed at the outlet of the heat dissipation coupling chamber (4). The two-side interfaces of the first passive magnetic pump are a liquid cooling medium return inlet and a gallium-based liquid metal alloy inlet, respectively. The two-side interfaces of the second passive magnetic pump are an outlet where the liquid cooling medium leaves the heat dissipation coupling chamber (4) and a gallium-based liquid metal alloy return inlet, respectively.

Furthermore, the liquid metal heat collection chamber (1) is in close contact with three high-hotspot areas of the charging gun head (18): the connection terminal (8), the charging plug head (9), and the root of the liquid-cooled cable (19). The heat from various high hotspots in the charging gun is absorbed by the gallium-based liquid metal alloy in the liquid metal heat collection chamber (1). The heat-absorbed gallium-based liquid metal alloy flows into the heat dissipation coupling chamber (4) through the liquid metal heat conduction tube (2).

Furthermore, a double electrical isolation barrier is provided between the heat dissipation coupling chamber (4) and the surrounding high-voltage insulation structure, with a dielectric strength not less than twice the rated operating voltage. It is equipped with a conductivity sensor, a pressure sensor, and a leakage sensor for real-time monitoring of gallium-based liquid metal alloy leakage and pressure anomalies. In case of failure, it triggers system protection and derated operation.

Advantages of the Present Invention Compared to the Prior Art

Application of Ultra-High Thermal Conductivity Materials: Uses gallium-based liquid metal alloy with a thermal conductivity of 40-60 W/m·K, which is 40-100 times that of traditional liquid cooling media, enabling extremely rapid heat extraction from heat-generating areas.

Revolutionary Enhancement in Heat Dissipation Area: In traditional liquid cooling schemes, the liquid cooling passage space has a diameter of about 8-10 mm and a length of 10-30 mm, with a heat dissipation contact area of only 250-950 mm². The present invention draws liquid metal from inside the gun head, with the liquid metal heat conduction tube having an inner diameter of 4-10 mm and a tube length of 160-400 mm. The gun head heat is diffused through liquid metal isotherm, expanding the heat dissipation area to 2000-12600 mm², increasing the heat dissipation area by more than 30 times on average.

Innovative Passive Drive Design: Uses a passive magnetic pump to drive rapid flow of the liquid metal. The driving force of the magnetic pump is borrowed from the high-speed flowing liquid cooling medium, which is introduced into the magnetic pump. The liquid cooling medium pushes the outer chamber gear of the magnetic pump, and through magnetic coupling, drives the inner chamber gear to circulate the liquid metal. Multiple passive magnetic pumps can be cascaded as needed.

Real-Time isothermal Technology: Achieves real-time isothermal of the liquid metal through rapid flow, keeping the temperature of the gun head portion basically consistent with the liquid cooling medium temperature through large-area heat exchange, greatly improving the heat dissipation efficiency of peak areas.

Adaptability to Extreme Cold Environments: The gallium-based liquid metal alloy has phase change characteristics, with the melting point adjustable to any temperature from −10° C. to +10° C. via formulation (boiling point above 2000° C.). The solid-liquid phase change latent heat is 60-80 J/g, enabling extreme cold environments below −60° C. to buffer thermal shocks through phase change, ensuring reliable operation in extreme environments.

System Compatibility and Economy: By solving the heat dissipation problem for the 40% heat hotspots in the entire cable (gun head connection terminals, charging plugs, and liquid-cooled cable roots), without changing the existing megawatt charging cable liquid cooling system, only a small amount of liquid metal (35-200 g) is needed, which can significantly increase the overall charging power.

REFERENCE NUMERALS

Figure 1:
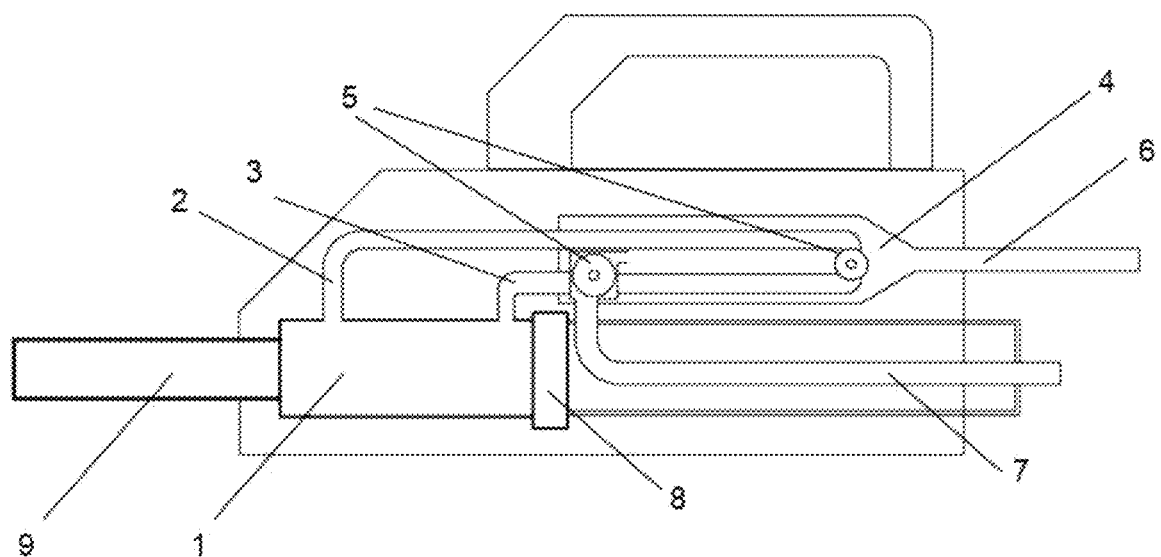
FIG. 1 is a schematic diagram of the overall structure of the present invention.
Figure 2:
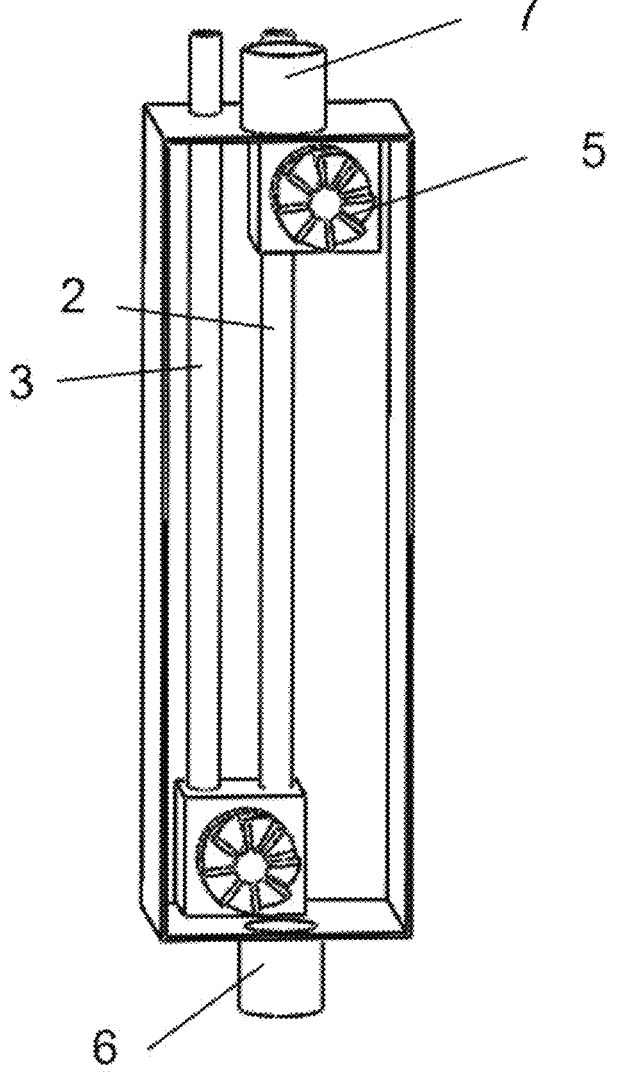
FIG. 2 is a structural diagram of the heat dissipation coupling chamber of the present invention.
Figure 3:
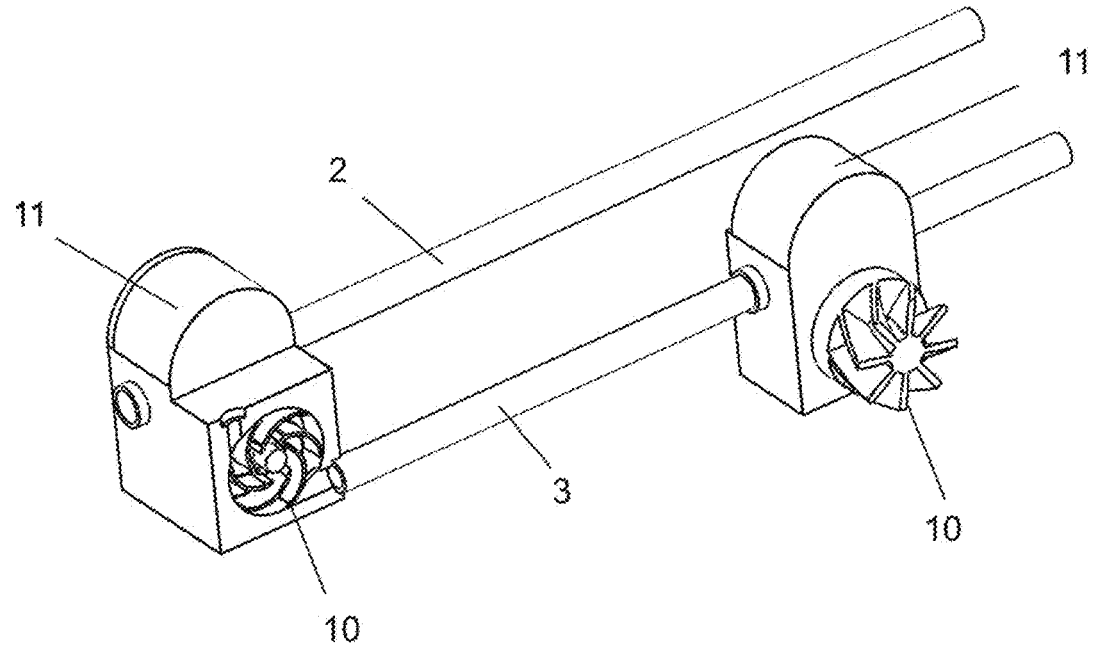
FIG. 3 is a structural diagram of the magnetic pump drive of the present invention.
Figure 4:
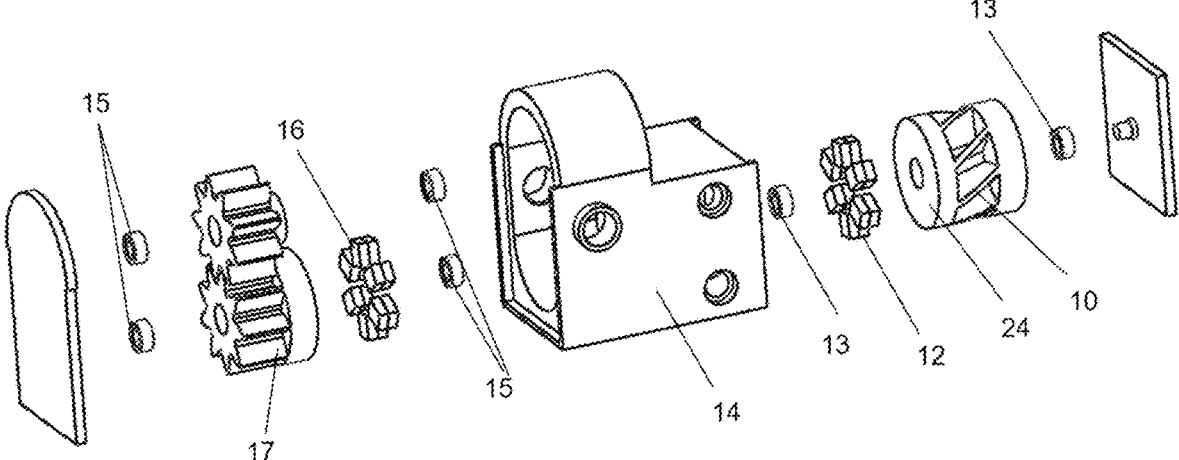
FIG. 4 is an internal structural diagram of the magnetic pump of the present invention.

1—Liquid metal heat collection chamber, 2—Liquid metal heat conduction tube, 3—Liquid metal heat conduction return tube, 4—Heat dissipation coupling chamber, 5—Magnetic pump, 6—Liquid cooling return tube, 7—Liquid cooling inlet tube, 8—Cable connection terminal, 9—Charging plug head, 10—Magnetic coupling outer gear, 11—Liquid metal chamber body, 12—Magnetic Pump Outer magnet, 13—Magnetic Pump Outer chamber bearing, 14—Magnetic pump closed chamber, 15—Magnetic Pump Inner chamber bearing, 16—Inner magnet, 17—Magnetic coupling inner gear, 18—Charging gun head, 19—Liquid-cooled cable, 20—Liquid-cooled charging module, 21—Radiator, 22—Water tank, 23—Water pump, 24—Magnetic Pump Outer magnetic disk.

DETAILED DESCRIPTION OF THE EMBODIMENTS

The following detailed description of the specific embodiments of the present invention is made in conjunction with the accompanying drawings.

Referring to FIGS. 1 to 4, this embodiment provides a heat dissipation device for a cable gun head through liquid metal isothermal extension coupled with liquid cooling loop, which is used for heat dissipation in high-temperature intensive areas of megawatt-level and above supercharging systems, such as charging gun heads and connector terminals, achieving peak heat dissipation for instantaneous high temperatures in narrow areas. Specifically, it is a local heat dissipation device for charging connectors based on coupling of gallium-based liquid metal alloy and liquid cooling loop, aimed at effectively solving the heat dissipation bottleneck problems in high heat flux density areas such as connection terminals, cable roots, and plug head contact areas under ultra-high power charging scenarios, while considering compatibility with existing systems and operational adaptability in extreme cold environments, without changing the existing liquid cooling heat dissipation system.

The heat dissipation device of this embodiment is disposed inside the charging gun head 18 of the liquid-cooled ultra-fast charging system, comprising a liquid metal heat collection chamber 1, a liquid metal heat conduction tube 2, a liquid metal heat conduction return tube 3, a heat dissipation coupling chamber 4, a magnetic pump 5, a liquid cooling return tube 6, and a liquid cooling inlet tube 7;

The liquid metal heat collection chamber 1 is disposed inside the connection conductor of the charging gun head 18, filled internally with gallium-based liquid metal alloy. The inlet end of the liquid metal heat conduction tube 2 communicates with the liquid metal heat collection chamber 1, and the outlet end extends outward to the heat dissipation coupling chamber 4 and connects to the inlet end of the liquid metal heat conduction tube 2. The outlet end of the liquid metal heat conduction return tube 3 communicates with the liquid metal heat collection chamber 1. The magnetic pump 5 is used to drive the gallium-based liquid metal alloy to circulate in the liquid metal heat collection chamber 1, the liquid metal heat conduction tube 2, and the liquid metal heat conduction return tube 3, forming liquid metal isotherm;

The inlet end of the liquid cooling inlet tube 7 communicates with the water tank 22 in the liquid-cooled ultra-fast charging system, and the outlet end communicates with the heat dissipation coupling chamber 4. The inlet end of the liquid cooling return tube 6 communicates with the heat dissipation coupling chamber 4, and the outlet end communicates with the radiator 21 in the liquid-cooled ultra-fast charging system. The heat dissipation coupling chamber 4 is disposed inside the charging gun handle for heat exchange between the gallium-based liquid metal alloy and the liquid cooling medium.

In this embodiment, the liquid metal heat collection chamber 1 is part of the charging gun head interior, typically made of high-purity copper with a thermal conductivity of 380 W/(m·K). The gun head is integrated with the connection terminal, cable root, and charging plug head contact area to ensure low thermal resistance heat transfer; the volume of the liquid metal heat collection chamber 1 is designed according to the gun head space (e.g., 10-15 mm inner diameter, 10-30 mm length) to adapt to different power scenarios;

The liquid metal heat collection chamber 1 is in close contact with three high-hotspot areas of the charging gun head 18: the connection terminal 8, the charging plug head 9, and the root of the liquid-cooled cable 19, ensuring direct contact of the liquid metal with the heat source to improve heat capture efficiency; the volume of the liquid metal in the liquid metal heat collection chamber 1 inside the gun head is collaboratively designed with the volumes of the liquid metal heat conduction tube 2 and the liquid metal heat conduction return tube 3 to ensure smooth circulation and heat management performance;

The heat from various high hotspots in the charging gun is absorbed by the gallium-based liquid metal alloy in the liquid metal heat collection chamber 1. The heat-absorbed gallium-based liquid metal alloy flows into the heat dissipation coupling chamber 4 through the liquid metal heat conduction tube 2. The liquid metal and the liquid cooling medium undergo efficient heat exchange in the heat dissipation coupling chamber 4 during flow, with the two not in direct contact, achieving isolated heat exchange between the liquid metal and the liquid cooling medium; through the isothermal layer formed by liquid metal flow, the heat generated by the connection terminal 8, the charging plug head 9, and the root of the liquid-cooled cable 19 is transferred in real time to the radiator 21 of the liquid-cooled ultra-fast charging system, expanding the heat diffusion area of the charging gun connection area by more than tens of times.

Specifically, the liquid cooling medium is deionized water plus ethylene glycol, thermal silicone oil, or fluorinated liquid, with a thermal conductivity of 0.1-1.0 W/m·K. The flow rate of the liquid cooling medium is 6-32 L/min, adapting to ambient temperatures from −50° C. to +45° C., used to meet the average heat dissipation of the liquid-cooled cable 19 and heat exchange with the gallium-based liquid metal alloy; the liquid cooling medium drives the magnetic pump 5 to operate, and the magnetic pump 5 drives the gallium-based liquid metal alloy to circulate. The single loop time of the gallium-based liquid metal alloy in the closed isothermal loop is 20-100 ms, ensuring rapid isotherm between the liquid metal heat collection chamber 1 and the liquid metal heat conduction tube 2.

The liquid metal is a gallium-indium-tin based gallium-based liquid metal alloy, with a melting point range of −10° C. to +10° C. and a boiling point above 2000° C.; the liquid metal has heat absorption capability during phase change, with solid-liquid phase change latent heat of 60-80 J/g, enabling buffering of thermal shocks through phase change in extreme cold environments below −60° C., ensuring cold start reliability. For extreme cold climates, cold start charging is possible, buffering start-up thermal surges through phase change. The liquid metal has phase change heat absorption performance at low temperatures. When the ambient temperature is below −50° C. and the liquidity of the liquid cooling medium decreases, the phase change heat absorption mechanism of the liquid metal absorbs instantaneous thermal surges from the charging gun connection, delaying the temperature rise peak and avoiding overheating issues caused by reduced liquid cooling heat dissipation efficiency at low temperatures.

Preferably, the inner wall of the liquid metal heat collection chamber 1 is treated with nickel plating or ceramic coating, and the liquid metal heat conduction tube 2 and the liquid metal heat conduction return tube 3 are made of copper, aluminum, or stainless steel with nickel plating or ceramic coating protection. The connection between the two and the liquid metal heat collection chamber 1 adopts a "metal seal+polytetrafluoroethylene hot-seal wrapping" double sealing structure: first mechanically or weld-sealed with a sealing ring, then vacuum-sealed with polytetrafluoroethylene wrap at the joint position to ensure no leakage of the liquid metal.

Preferably, the length of the liquid metal heat conduction tube 2 and the liquid metal heat conduction return tube 3 inside the heat dissipation coupling chamber 4 is 80-200 mm, and both have an inner diameter of 4-10 mm. The outer surfaces of the liquid metal heat conduction tube 2 and the liquid metal heat conduction return tube 3 are configured as smooth structures, corrugated structures, or heat dissipation fin structures, with heat dissipation fins or corrugations increasing the heat dissipation area and turbulence. The outlet end of the liquid metal heat conduction tube 2 connects to the inlet end of the liquid metal heat conduction return tube 3 to form a U-shaped structure. The gallium-based liquid metal alloy returns to the liquid metal heat collection chamber 1 through the U-shaped loop, forming a complete closed isothermal loop.

Preferably, a double electrical isolation barrier is provided between the heat dissipation coupling chamber 4 and the surrounding high-voltage insulation structure, with a dielectric strength not less than twice the rated operating voltage. It is equipped with a conductivity sensor, a pressure sensor, and a leakage sensor for real-time monitoring of gallium-based liquid metal alloy leakage and pressure anomalies. In case of failure, it triggers system protection and derated operation. The heat dissipation coupling chamber 4 has one positive and one negative charging conductor inside the charging handle, positioned on both sides of the cable and away from each other.

In the heat dissipation coupling chamber 4, the liquid metal exchanges heat with the returning liquid cooling medium in the heat dissipation coupling chamber 4 through the outer surface of the liquid metal heat conduction tube 2. The cooled liquid metal in the heat dissipation coupling chamber 4 then circulates back to the liquid metal heat collection chamber 1 in the gun head through the liquid metal heat conduction return tube 3. The liquid metal and the liquid cooling medium exchange heat only through the tube wall in the heat dissipation coupling chamber 4, without direct contact.

Preferably, the magnetic pump 5 comprises a magnetic coupling outer gear 10, a liquid metal closed drive chamber 11, an outer magnetic disk 24, an outer magnet 12, an outer bearing 13, a magnetic pump closed chamber 14, an inner bearing 15, an inner magnet 16, a magnetic coupling inner gear 17, liquid cooling medium inlet and outlet flow channels 6, 7, and liquid metal inlet and outlet pipes 2, 3; the inner and outer chambers of the magnetic pump 5 are two separate closed systems. The outer chamber connects to the liquid cooling return tube 6, and the liquid cooling medium passes through the magnetic coupling outer gear 10 to the heat dissipation coupling chamber 4. The inner chamber inlet and outlet connect to the liquid metal heat conduction tube 2, and the liquid metal is pushed by rotation of the magnetic coupling inner gear 17 in the inner chamber;

The magnetic coupling outer gear 10 and the magnetic coupling inner gear 17 are each embedded with 4-8 permanent magnets having a surface magnetic induction strength of approximately 3500G-5000G. The inner and outer permanent magnets are isolated by a 1-2 mm closed chamber. The magnetic coupling outer gear 10 and the magnetic coupling inner gear 17 are magnetically coupled. The liquid cooling medium enters the outer chamber of the magnetic pump 5, pushing the magnetic coupling outer gear 10 to rotate. The magnets on the magnetic coupling outer gear 10 magnetically couple with the magnets on the magnetic coupling inner gear 17, driving the magnetic coupling inner gear 17 to rotate through magnetic coupling, and the rotation of the magnetic coupling inner gear 17 drives the liquid metal to flow, thereby achieving liquid metal circulation without an external motor.

The power of the magnetic pump is borrowed from the high-speed flowing liquid cooling medium, which is introduced into the magnetic pump. The liquid cooling medium pushes the magnetic coupling outer gear 10, and through the coupling force of the magnets embedded in the magnetic coupling outer gear 10, drives the magnetic coupling inner gear 17 embedded with magnets in the liquid metal closed chamber, thereby driving the liquid metal to circulate.

The number of magnetic pumps 5 is two, respectively a first passive magnetic pump disposed at the inlet of the heat dissipation coupling chamber 4 and a second passive magnetic pump disposed at the outlet of the heat dissipation coupling chamber 4. The two-side interfaces of the first passive magnetic pump are a liquid cooling medium return inlet and a gallium-based liquid metal alloy inlet, respectively. The two-side interfaces of the second passive magnetic pump are an outlet where the liquid cooling medium leaves the heat dissipation coupling chamber 4 and a gallium-based liquid metal alloy return inlet, respectively.

The present invention dissipates the heat generated by the connection terminal, cable root, and charging plug head contact area to a larger liquid cooling area through a "gun head heat source-liquid metal-heat conduction tube-liquid cooling heat exchange-liquid metal return to gun head heat source" circulation heat dissipation path. The heat dissipation device of the present invention adopts a multi-stage heat dissipation architecture of "direct heat source contact-closed circulation-enlarged efficient heat exchange" for the liquid metal. Relying on the excellent thermal conductivity of the liquid metal (thermal conductivity up to 40-60 W/m·K, approximately 100-200 times that of traditional liquid cooling media), it can quickly capture the heat generated in high heat flux density areas inside the gun head, extend it through the liquid metal heat conduction tube to the specially designed heat dissipation coupling chamber in the handle for heat exchange with the returning liquid cooling medium. The liquid metal is driven to circulate by the magnetic pump, which is powered by the returning of cooling liquid.

The present invention can expand the effective heat dissipation area of high heat flux density areas inside the charging gun by more than a hundred times, enhancing the ability to cope with extreme heat loads while significantly reducing the overall heat dissipation burden of the system. Based on the phase change characteristics (PCM) of the gallium-based liquid metal alloy, it helps the liquid-cooled charging gun achieve cold start in extreme cold environments below −50° C., effectively solving the problem of heat dissipation failure under low-temperature conditions.

The present invention can significantly increase the overall charging power by integrating this liquid metal heat dissipation device inside the gun head without changing the main structure of the existing liquid cooling charging system, achieving more than 40% improvement in the overall cable heat dissipation efficiency for "peak heat dissipation" in the gun head. The liquid metal of the present invention has extremely high efficiency for heat dissipation in local high-temperature areas and can also be applied to concentrated high-temperature areas in charging modules, such as IGBTs or other high-power chips. The liquid cooling driven magnetic pump (passive magnetic pump) of the present invention can be used in liquid metal flow heat dissipation in other liquid cooling fields, including but not limited to GPU and CPU liquid cooling heat dissipation areas.

Figure 5:
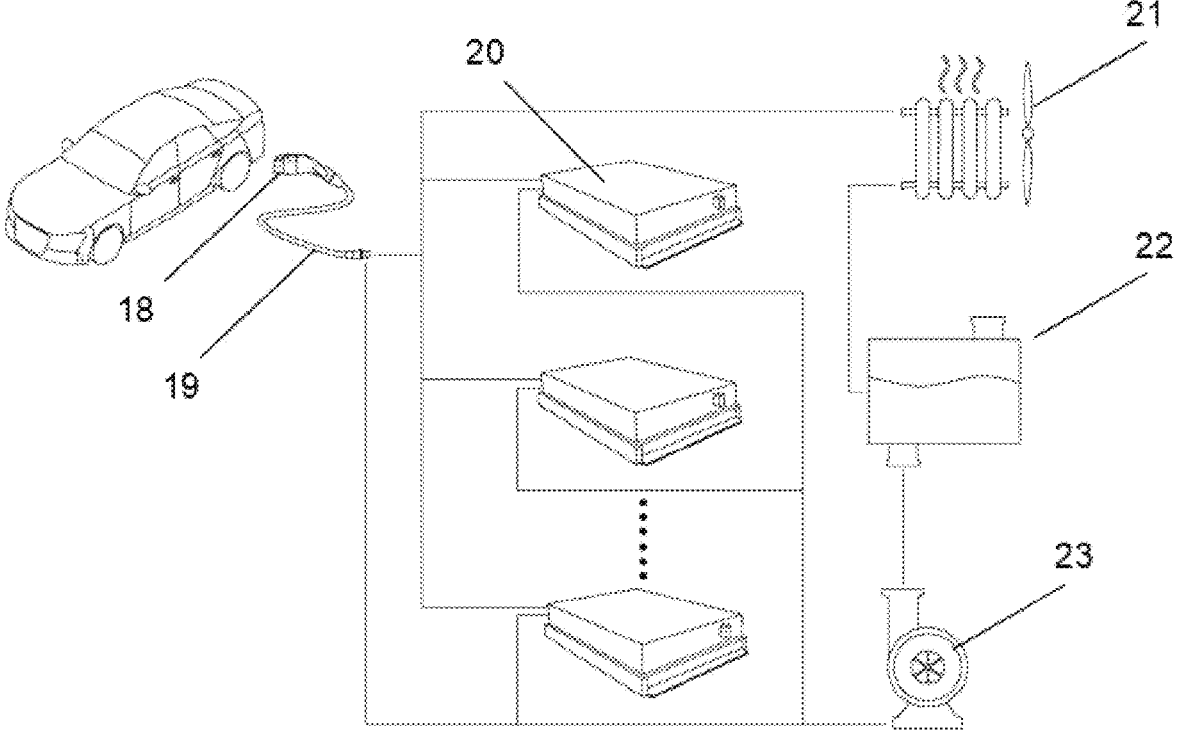
FIG. 5 is an integration schematic diagram of the liquid-cooled ultra-fast charging system.

As shown in FIG. 5, a typical liquid-cooled ultra-fast charging system is displayed, in which the heat dissipation device of the present invention can be applied, where the cable liquid cooling heat dissipation technology is the aforementioned prior art patents, and the advantage of the present invention is compatibility with existing liquid cooling heat dissipation technologies.

Specifically, the liquid-cooled ultra-fast charging system comprises a charging gun head 18, a liquid-cooled cable 19, a liquid-cooled charging module 20, a radiator 21, a water tank 22, and a water pump 23. The water pump 23 is used to drive the liquid cooling medium to circulate in the liquid-cooled cable 19, the liquid cooling inlet tube 7, the liquid cooling return tube 6, the radiator 21, and the water tank 22. The magnetic pump 5 is driven by the return flow of the liquid cooling medium.

Specific Implementation Schemes:

I. Design Using Dual Magnetic Pump in the Heat Dissipation Coupling Chamber (FIG. 2):

The heat dissipation coupling chamber (e.g., dimensions 40×40×100 mm) is disposed in the handle and communicates with the liquid cooling return main pipe; a No. 1 passive magnetic pump is arranged at the coupling chamber inlet, with two-side interfaces being the liquid cooling medium return inlet and the liquid metal heat conduction tube inlet, respectively; a No. 2 passive magnetic pump is arranged at the coupling chamber outlet, with two-side interfaces being the outlet where the liquid cooling medium leaves the coupling chamber (merging into the return pipe) and the liquid metal return inlet (connecting to the heat conduction tube loop), respectively.

The heat collection chamber inside the gun head is nickel-plated or ceramic-coated for protection, filled with gallium-based liquid metal alloy; the gun head, connection terminal, and root are wrapped by a liquid cooling jacket (which may be immersion type or close-contact microchannel, etc.). The liquid metal heat conduction tube has an inner diameter of 6 mm, with a total round-trip length of 160 mm (U-shaped), and heat dissipation fins around the outer surface of the heat conduction tube, 2 mm high, spaced 5 mm apart; the heat collection chamber inside the gun head has dimensions of 15 mm inner diameter and 20 mm length. The charging gun liquid cooling return main pipe has an inner diameter of 10 mm.

II. Magnetic Pump Parameters:

The magnetic pump's outer rotor can be composed of 6 permanent magnets with a surface magnetic induction strength of approximately 3500 G-5000 G (alternating N and (LM) and liquid cooling in the heat dissipation chamber. Total transfer is the parallel sum of the two;

With benchmark liquid cooling flow rate $Q\_w=14$ L/min, $UA\_A=150$ W/K, $Q\_LM=2$ L/min→$UA\_B=100$ W/K, and calibrated with turbulent flow empirical exponent: $UA\_A=150\times(Q\_w/14)^{0.8}$; $UA\_B=100\times(Q\_LM/2)^{0.8}$; $UA\_total=UA\_A+UA\_B$.

(3) As charging power increases, the liquid cooling medium flow rate increases, and the liquid metal flow rate driven by the liquid cooling medium also increases synchronously.

(4) Steady-state temperature difference for gun head heat dissipation: $\Delta T\_ss=Q\_gun/UA$ total.

Heat Dissipation Capabilities Under Various Operating Conditions:

Table of Heat Conduction Capability for Cable Gun Head with Liquid Metal and Liquid Cooling Loop Coupling

| Operating Condition | Q_w (L/min) | Q_LM (L/min) | UA_A (W/K) | UA_B (W/K) | UA_tot (W/K) | Gun Head Heat (W) | Steady-State ΔT (K) | LM Inlet Temperature Rise at Coupling Chamber Inlet |
|---|---|---|---|---|---|---|---|---|
| 1.5 MW | 10 | 1.43 | 114.6 | 100.9 | 215.5 | 1800 | 8.4 | ~23.1K |
| 2.0 MW | 14 | 2 | 150 | 132 | 282 | 2400 | 8.5 | ~22.5K |
| 2.5 MW | 20 | 2.86 | 199.5 | 175.7 | 375.2 | 3000 | 8 | ~20.3K |
| 3.0 MW | 28 | 4 | 261.2 | 229.8 | 491 | 3600 | 7.3 | ~17.8K |

S), rotated by fluid push when the liquid cooling passes through the coupling chamber; the outer rotor magnetically couples with the inner magnetic disk through an isolation sleeve, driving the impeller/shear disk in the liquid metal passage, thereby achieving liquid metal circulation without an external motor. The two-stage pumps are respectively located at the heat dissipation coupling chamber inlet/outlet, which can increase the driving power for liquid metal flow, suppress return pulsation, and improve the flow speed.

In engineering, the liquid metal flow rate is approximately proportional to the liquid cooling flow rate (when magnetic coupling efficiency and pump efficiency are stable), constrained by the pressure drop in the liquid metal circulation. The following calculation table is based on the benchmark "14 L/min water→2 L/min liquid metal."

III. Operating Conditions and Heat Sources

Assuming charging efficiency of 99.7%, gun head heat accounts for 40%. Liquid cooling inlet reference 35° C. Single gun operating conditions and corresponding liquid cooling return flow rates:

| Single Gun Charging Power | Corresponding Liquid Cooling Flow Rate (L/min) | Gun Head Heat Load (40%) (kW) $Q\_gun = P \times (1 - \eta) \times 40\%$ |
|---|---|---|
| 1.5 MW | 10 | 1.8 |
| 2 MW | 14 | 2.4 |
| 2.5 MW | 20 | 3.0 |
| 3 MW | 28 | 3.6 |

IV. Combined Heat Dissipation Calculation for Gun Head Under Various Operating Conditions (1) Liquid metal flow rate estimation: $Q\_LM\approx2$ L/min× $(Q\_w/14)$.

(2) Total heat transfer UA_Total can be decomposed into two: UA_A for the liquid cooling jacket wrapping the outer side of the gun head terminal and UA_B for the isolation heat exchange section between liquid metal The calculation table shows that at 2.0-3.0 MW levels, the liquid metal coupled heat dissipation can control the steady-state ΔT to ~7-9 K and significantly reduce peak overshoot.

Liquid metal (LM) flow update time (circulating the LM in the gun head once) is based on the total liquid metal volume≈8 mL (collection chamber+6 mm×160 mm tube); 2 L/min=33.3 mL/s. Each loop requires 8/33.3≈0.24 s, so it can "refresh" approximately 4 times per second, forming isotherm between the gun head heat collection chamber and the heat dissipation chamber. The liquid metal, relying on its high thermal conductivity, high heat capacity, and low interfacial thermal resistance to the metal substrate, can rapidly "spread" local hotspots when transient heat flux is generated at the heat source, forming an approximately isothermal liquid conduction layer; at the same time, the liquid metal is closed-loop circulated to the coupling heat exchange chamber at approximately 2 L/min flow rate through the heat conduction tube, achieving a path of "in-situ isothermal-rapid heat transport-isolation convective heat exchange."

Using this device's geometry as an example (collection chamber inner diameter 15 mm, length 20 mm; heat-transfer tube inner diameter 6 mm, total round-trip length 160 mm), the total effective volume of liquid metal is on the order of milliliters, and the single "refresh time" is about 0.2-0.3 s. The thermal diffusion time of the liquid metal over a 1-2 mm length scale is 0.06-0.24 s, and the Reynolds number inside the tube lies in the turbulent regime. As a result, temperature gradients in very small areas—such as at the base of the charging gun head and the connection terminals—can be evened out within sub-second timescales, significantly suppressing temperature overshoot caused by short current spikes.

Subsequently, the liquid metal carries the isothermal heat to the heat-exchange coupling chamber inside the handle, where isolated convective heat transfer occurs through the liquid metal heat conduction tube wall with the external liquid-cooling loop, which removes the heat. By coupling liquid-metal and liquid-cooling heat dissipation, hot-spot peak shaving near the source and rapid heat removal can be achieved without increasing the wetted area of high voltage regions or the insulation burden. This reduces peak temperature rise, shortens the cooldown time, and improves the system's thermal stability and reliability during high-power charging.

The above descriptions are merely preferred embodiments of the present invention and do not limit the technical scope of the present invention in any way. Therefore, any minor modifications, equivalent changes, and modifications made to the above embodiments based on the technical essence of the present invention still fall within the scope of the technical solution of the present invention.

What is claimed is:

1. A cable charging cable gun heat dissipation device that couples liquid-metal isothermal spreading with a liquid-cooling circulation, the cable charging cable gun heat dissipation device being disposed inside a charging cable gun of a liquid-cooled ultra-fast charging system, comprising: a liquid-metal (LM) heat-source collection chamber; a liquid-metal heat conduction tube; a liquid-metal heat return tube; a heat-exchange coupling chamber; a magnetic pump; a liquid-cooling return pipe; and a liquid-cooling inlet pipe; wherein the LM heat-source collection chamber is formed within a conductor of the charging cable gun and is filled with a gallium-based liquid metal; an inlet end of the liquid-metal heat conduction tube is in fluid communication with the LM heat-source collection chamber, and an outlet end of the liquid-metal heat conduction tube extends outward to the heat-exchange coupling chamber; an outlet end of the liquid-metal heat return tube is in fluid communication with the LM heat-source collection chamber; and the magnetic pump is configured to drive circulation of the gallium-based liquid metal through the LM heat-source collection chamber, the liquid-metal heat conduction tube, and the liquid-metal heat return tube to achieve real-time isothermal spreading; wherein an inlet end of the liquid-cooling inlet pipe communicates with a reservoir of the liquid-cooled ultra-fast charging system and an outlet end of the liquid-cooling inlet pipe communicates with the heat-exchange coupling chamber; an inlet end of the liquid-cooling return pipe communicates with the heat-exchange coupling chamber and an outlet end of the liquid-cooling return pipe communicates with a radiator of the liquid-cooled ultra-fast charging system; and the heat-exchange coupling chamber is disposed within a handle of a charging connector and configured to allow heat exchange between the gallium-based liquid metal and a liquid-cooling medium.

2. The cable charging cable gun heat dissipation device of claim 1, wherein the liquid-cooled ultra-fast charging system comprises the charging cable gun, a liquid-cooled cable, a liquid-cooled charging module, the radiator, the reservoir, and a water pump configured to drive circulation of the liquid-cooling medium through the liquid-cooled cable, the liquid-cooling inlet pipe, the liquid-cooling return pipe, the radiator, and the reservoir, and wherein the magnetic pump is driven by a returning liquid-cooling medium.

3. The cable charging cable gun heat dissipation device of claim 1, wherein an inner wall of the LM heat-source collection chamber is nickel-plated or ceramic-coated, and the liquid-metal heat conduction tube and the liquid-metal heat return tube are made of copper, aluminum, or stainless steel with nickel protection, and a junction between the liquid-metal heat conduction tube and the LM heat-source collection chamber and a junction between the liquid-metal heat return tube and the LM heat-source collection chamber are first mechanically or welded-sealed via a sealing ring, and then vacuum-sealed at a joint with polytetrafluoroethylene (PTFE) wrap.

4. The cable charging cable gun heat dissipation device of claim 1, wherein portions of the liquid-metal heat conduction tube and the liquid-metal heat return tube located inside the heat-exchange coupling chamber each have a length of 80-200 mm and an inner diameter of 4-10 mm, and outer surfaces of the liquid-metal heat conduction tube and the liquid-metal heat return tube are configured as smooth, corrugated, or finned structures.

5. The cable charging cable gun heat dissipation device of claim 2, wherein the outlet end of the liquid-metal heat conduction tube is connected to an inlet end of the liquid-metal heat return tube to form a U-shaped structure, thereby returning the gallium-based liquid metal to the LM heat-source collection chamber and constituting a closed LM isothermal loop.

6. The cable charging cable gun heat dissipation device of claim 5, wherein the liquid-cooling medium is either deionized water with ethylene glycol, thermal oil, or fluorinated liquid having a thermal conductivity of 0.1-0.4 W/m·K, with a flow rate of 6-32 L/min, suitable for an ambient temperature of −50° C. to +45° C., and used for average heat dissipation of the liquid-cooled cable and the heat exchange with the gallium-based liquid metal; wherein the liquid-cooling medium drives operation of the magnetic pump, the magnetic pump drives the circulation of the gallium-based liquid metal, and a single-pass circulation time of the gallium-based liquid metal in the closed isothermal loop is 20-100 ms.

7. The cable charging cable gun heat dissipation device of claim 1, wherein the magnetic pump comprises a magnetically coupled external gear, an LM sealed drive chamber, an external magnetic disk, external magnets, an outer bearing, a pump isolation housing, an inner bearing, inner magnets, a magnetically coupled internal gear, flow passages for the liquid-cooling medium, and flow passages for the gallium-based liquid metal; wherein an outer cavity of the magnetic pump is a sealed system connected to the liquid-cooling return pipe such that the liquid-cooling medium passes the magnetically coupled external gear to the heat-exchange coupling chamber, and an inner cavity of the magnetic pump is a sealed system connected to the liquid-metal heat conduction tube, the gallium-based liquid metal is propelled in the inner cavity by rotation of the magnetically coupled internal gear; and wherein each of the magnetically coupled external gear and the magnetically coupled internal gear embeds 4-8 permanent magnets having a surface magnetic induction of 3500-5000 G, with inner and outer permanent magnets separated by a 1-2 mm isolation wall within a sealed housing, such that the magnetically coupled external gear driven by the liquid-cooling medium magnetically couples to and drives the magnetically coupled internal gear to circulate the gallium-based liquid metal without an electric motor.

8. The cable charging cable gun heat dissipation device of claim 1, wherein the magnetic pump comprises a first passive magnetic pump disposed at an inlet of the heat-exchange coupling chamber and a second passive magnetic pump disposed at an outlet of the heat-exchange coupling chamber, the first passive magnetic pump has interfaces respectively for a return port of the liquid-cooling medium and an inlet of the gallium-based liquid metal, and the second passive magnetic pump has interfaces respectively for an outlet of the liquid-cooling medium leaving the heat-exchange coupling chamber and a return port of the gallium-based liquid metal.

9. The cable charging cable gun heat dissipation device of claim 2, wherein the LM heat-source collection chamber is in tight thermal contact with connector terminals, a charging plug head, and a root portion of the liquid-cooled cable, wherein the connector terminals, the charging plug head, and the root portion of the liquid-cooled cable are three high-temperature hot-spot regions, such that heat at hot spots is absorbed by the gallium-based liquid metal in the LM heat-source collection chamber, and heated LM flows through the liquid-metal heat conduction tube to the heat-exchange coupling chamber.

10. The cable charging cable gun heat dissipation device of claim 1, wherein dual electrical isolation barriers are provided between the heat-exchange coupling chamber and surrounding high-voltage insulation structures, the dual electrical isolation barriers have a dielectric strength not less than twice a rated operating voltage of the liquid-cooled ultra-fast charging system, and wherein conductivity, pressure, and leakage sensors are configured to monitor LM leakage and pressure anomalies in real time and to trigger system protection and derating upon fault.

11. The cable charging cable gun heat dissipation device of claim 7, wherein the magnetic pump comprises a first passive magnetic pump disposed at an inlet of the heat-exchange coupling chamber and a second passive magnetic pump disposed at an outlet of the heat-exchange coupling chamber, the first passive magnetic pump has interfaces respectively for a return port of the liquid-cooling medium and an inlet of the gallium-based liquid metal, and the second passive magnetic pump has interfaces respectively for an outlet of the liquid-cooling medium leaving the heat-exchange coupling chamber and a return port of the gallium-based liquid metal.

* * * * *